United States Patent [19]
Horner

[11] Patent Number: 6,003,298
[45] Date of Patent: Dec. 21, 1999

[54] STEAM DRIVEN VARIABLE SPEED BOOSTER COMPRESSOR FOR GAS TURBINE

[75] Inventor: Michael W. Horner, West Chester, Ohio

[73] Assignee: General Electric Company, Cincinnati, Ohio

[21] Appl. No.: 08/955,803

[22] Filed: Oct. 22, 1997

[51] Int. Cl.[6] .................................................. F02C 6/18
[52] U.S. Cl. .......................................... 60/39.182; 60/726
[58] Field of Search ........................... 60/39.161, 39.181, 60/39.182, 39.54, 726

[56] References Cited

U.S. PATENT DOCUMENTS

| 2,625,012 | 1/1953 | Larrecq | 60/39.161 |
| 4,896,499 | 1/1990 | Rice | 60/39.161 |

FOREIGN PATENT DOCUMENTS

| 208624 | 8/1988 | Japan | 60/39.182 |
| 679007 | 9/1952 | United Kingdom | 60/39.182 |

Primary Examiner—Louis J. Casaregola
Attorney, Agent, or Firm—Andrew C. Hess; Rodney M. Young

[57] ABSTRACT

A gas turbine engine that includes a steam driven variable speed booster compressor is described. In one embodiment, the engine includes a low pressure turbine and a booster compressor rotatable on a low pressure shaft. The engine further includes a high pressure compressor, a high pressure combustor, and a high pressure turbine rotatable on a high pressure (HP) shaft and forming the core engine. The output of the low pressure compressor is supplied to an intercooler, and the output of the intercooler is supplied to the high pressure compressor. The engine further includes a power turbine downstream of the high pressure turbine, and the power turbine is coupled to a generator by a shaft. The output exhaust of the power turbine is supplied to an exhaust heat boiler, and steam output by the boiler is supplied to, and drives, the low pressure turbine. Steam from the boiler may also be supplied to the high pressure combustor and to the power turbine. Since the steam is generated from the power turbine exhaust heat, the amount of steam flow can be independently varied from the gas turbine engine primary conditions, consistent of course with the gas turbine exhaust flow/temperature limitations.

18 Claims, 1 Drawing Sheet

STEAM DRIVEN VARIABLE SPEED BOOSTER COMPRESSOR FOR GAS TURBINE

FIELD OF THE INVENTION

This invention relates generally to gas turbine engines and more particularly, to a gas turbine engine including a steam driven booster compressor.

BACKGROUND OF THE INVENTION

Gas turbine engines generally include a high pressure compressor for compressing air flowing through the engine, a combustor in which fuel is mixed with the compressed air and ignited to form a high energy gas stream, and a high pressure turbine. The high pressure compressor, combustor and high pressure turbine sometimes are collectively referred to as the core engine. Such gas turbine engines also may include a low pressure compressor, or booster compressor, for supplying compressed air, for further compression, to the high pressure compressor.

The booster compressor typically is driven by gas turbine stages located axially aft of the higher pressure turbine stages. This configuration is common for land and marine gas turbines as well as aircraft jet engines. In one specific engine, the low pressure compressor is driven by a power turbine which also drives a load device.

With such gas turbine configurations, the low pressure spool, i.e., the low pressure compressor and the low pressure turbine, speed is set by operating conditions and is not separately variable. As a result, compressor bleed at the low pressure compressor discharge area is required for startup and transients, and for dry low emissions combustor operation at some conditions.

It would be desirable to provide a gas turbine engine wherein the low pressure compressor is operable at variable speed and flow independent of the core engine speed. Such a configuration would enable independent regulation of low pressure compressor airflow which, in turn, aids in matching low pressure compressor and high pressure compressor flow characteristics for startup, transient, and for dry low emissions combustor requirements as power is reduced.

SUMMARY OF THE INVENTION

These and other objects may be attained by a gas turbine engine that includes a steam driven variable speed booster compressor. More particularly, and in one embodiment, the engine includes a low pressure turbine and a booster compressor rotatable on a low pressure shaft. The engine further includes a high pressure compressor, a high pressure combustor, and a high pressure turbine rotatable on a high pressure (HP) shaft and forming the core engine. The output of the low pressure compressor is supplied to an intercooler, and the output of the intercooler is supplied to the high pressure compressor. The engine further includes a power turbine downstream of the high pressure turbine, and the power turbine is coupled to a generator by a shaft.

The output exhaust of the power turbine is supplied to an exhaust heat boiler, and steam output by the boiler is supplied to, and drives, the low pressure turbine. Steam from the boiler may also be supplied to the high pressure combustor and to the power turbine. Since the steam is generated from the power turbine exhaust heat, the amount of steam flow can be independently varied from the gas turbine engine primary conditions, consistent of course with the gas turbine exhaust flow/temperature limitations.

The above described engine provides the advantage that the low pressure compressor speed and flow can be controlled independently of the gas turbine core engine speed. Therefore, independent regulation of the low pressure compressor airflow can be performed, which facilitates matching the lower pressure compressor and the high pressure compressor flow characteristics for startup, transients, and for dry low emissions combustor requirements as power is reduced. Further, steam which drives the low pressure turbine does not need to be compressed, thereby improving overall cycle efficiency. Specifically, the steam pressure is achieved through boiler pressure, such as in a steam turbine cycle. That is, the above described cycle is more efficient than one in which energy of the gas turbine air stream is required to drive the low pressure turbine. In addition, the low pressure shaft need not be concentric with the high pressure shaft. This configuration simplifies the shafting and bearing structures, and also simplifies maintenance.

Further, by independently controlling the low pressure compressor speed and airflow, the transition from a 60 cycle electric generator to a 50 cycle electric generator can be performed without requiring significant hardware changes and without significantly sacrificing thermodynamic cycle performance. With the independently controlled low pressure compressor, the low pressure compressor can be maintained at high speed or even increased speed to maintain the gas turbine airflow when the generator operates at the lower speed required for 50 cycle electric generator operation.

BRIEF DESCRIPTION OF THE DRAWINGS

The drawing is a schematic illustration of a gas turbine engine in accordance with one embodiment of the present inventions.

DETAILED DESCRIPTION

Figure 1:
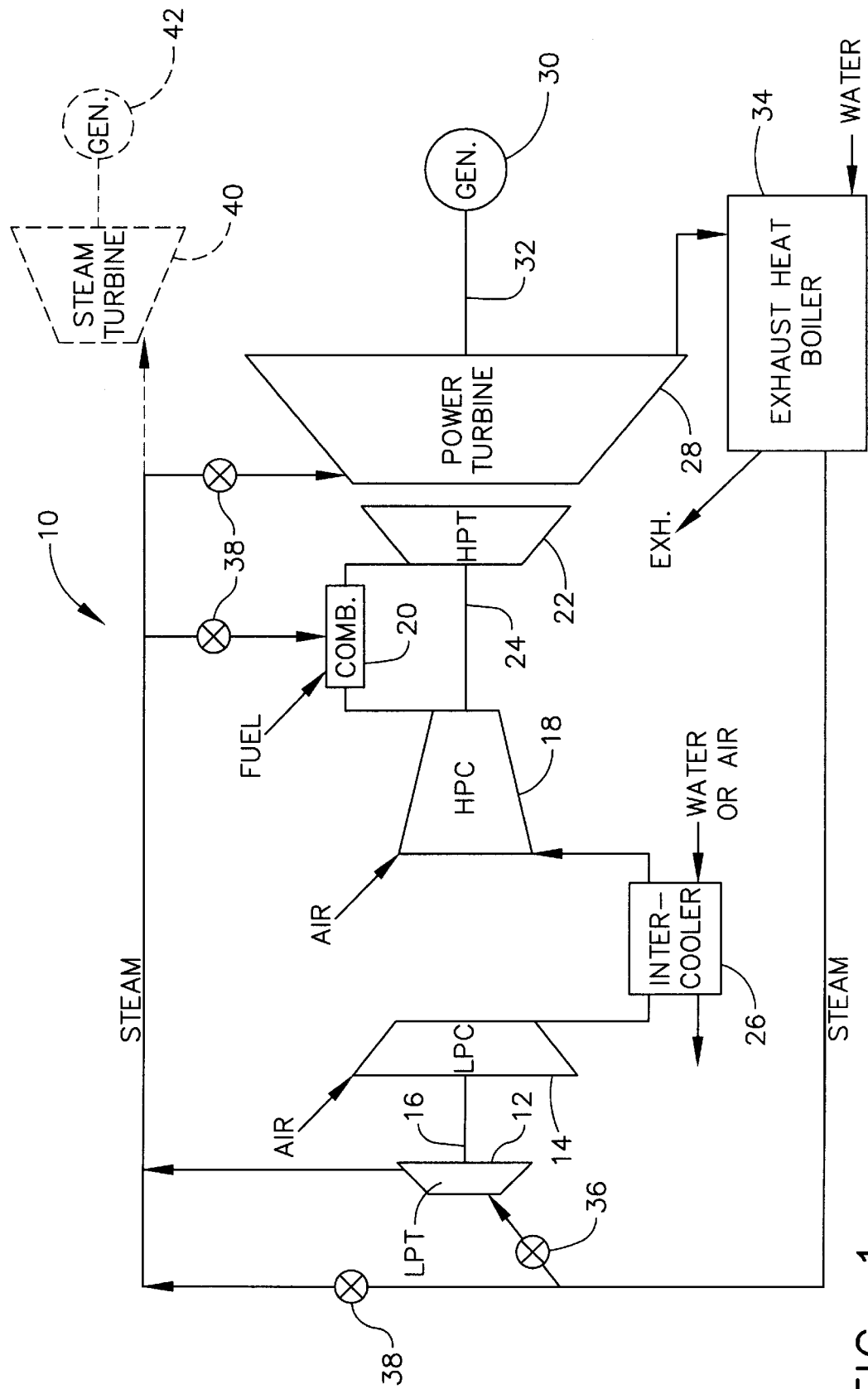

The FIGURE illustrates, in schematic form, a gas turbine engine 10 in accordance with one embodiment of the present invention. Engine 10 may be particularly useful in industrial applications, such as to drive a large electric generator capable of outputting in excess of 75 megawatts. Engine 10, however, may be used in many other applications.

Referring specifically to the FIGURE, engine 10 includes a low pressure turbine 12 and a booster, or low pressure, compressor 14 rotatable on a low pressure shaft 16. Engine 10 further includes a high pressure compressor 18, a high pressure combustor 20, and a high pressure turbine 22 rotatable on a high pressure (HP) shaft 24 and forming the core engine. The output of low pressure compressor 14 is supplied to an intercooler 26, and the output of intercooler 26 is supplied to high pressure compressor 18. Intercooler 26 is optional, and is not necessary to provide the benefits described below. Engine 10 further includes a power turbine 28 downstream of high pressure turbine 22, and power turbine 28 is coupled to a generator 30 by an output shaft 32. The output exhaust of power turbine 28 is supplied to an exhaust heat boiler 34, and steam output by boiler 34 is supplied to, and drives, low pressure turbine 12. A control valve 36 controls the amount of steam supplied to low pressure turbine 12.

Each of the components of engine 10 described above are well known and commercially available. For example, such components are commercially available from General Electric Company, Cincinnati, Ohio.

Since the steam is generated from the power turbine exhaust heat, the amount of steam flow to low pressure turbine 12 can be independently varied from the gas turbine engine primary conditions, consistent of course with the gas turbine exhaust flow/temperature limitations. Varying the amount of steam flow to drive low pressure compressor 14 enables independent control of the airflow and speed of low pressure compressor 14. That is, low pressure compressor speed and flow can be controlled independently of the gas turbine core engine speed. Therefore, independent regulation of the low pressure compressor airflow can be performed, which facilitates matching low pressure compressor and high pressure compressor flow characteristics for startup, transients, and for dry low emissions combustor requirements as power is reduced. In addition, the variable stator geometry of compressor 14 can be varied to affect flow, speed, and pressure. For example, compressor 14 could include variable stators.

Steam which drives low pressure turbine 12 does not need to be compressed, which facilitates improving overall cycle efficiency. Particularly, the above described cycle is more efficient than one in which energy of the gas turbine air steam is required to drive a low pressure turbine. In addition, low pressure shaft 16 need not be concentric with high pressure shaft 24, which simplifies shafting/bearing structures and maintenance.

Further, by independently controlling the low pressure compressor speed and airflow, the transition from a 60 cycle electric generator to a 50 cycle electric generator can be performed without requiring significant hardware changes and without significantly sacrificing thermodynamic cycle performance. With independently controlled low pressure compressor 14, low pressure compressor 14 can be maintained at high speed or even increased speed to maintain the gas turbine airflow when generator 30 operates at the lower speed required for 50 cycle electric generator operation.

For startup, the low pressure compressor steam driven turbine stages may be driven by a separate steam boiler, firing exhaust heat boiler 34 using a forced draft fan, or otherwise providing steam to the low pressure compressor driver turbine at appropriate flow, temperature, and pressure conditions. Once startup is complete, the speed of low pressure compressor 14 may be controlled by controlling the amount of steam supplied to low pressure turbine 12.

Of course, many variations of the above described cycle are possible. For example, and as shown in the FIGURE, steam from boiler 34 may also be supplied to high pressure combustor 20, high pressure turbine 22, and to power turbine 28. Steam output by low pressure turbine 12 also may be supplied to combustor 20 and to power turbine 28 via steam lines. Injection of steam into these components may be readily performed if the overall configuration is a steam injected (STIG) or intercooled steam injected (ISTIG) gas turbine. Control valves 38 are utilized to control the amount of steam delivered to combustor 20, high pressure turbine 28, and power turbine 28. In addition, steam could flow to a steam turbine 40 driving a generator 42 (shown in phantom), which could already be in place if the overall arrangement is a combined cycle. It also is possible to drive the low pressure compressor driver turbine using fluids other than water/steam as the working fluid if, for example, bottoming cycle such as an Ormat Organic Bottoming cycle or a water/ammonia based Kalina bottoming cycle is utilized.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, steam from low pressure turbine 12 could be returned to boiler 34, reheated and mixed into the main steam or otherwise used to enhance cycle heat rate. Accordingly, the spirit and scope of the invention are to be limited only by the terms of the appended claims.

I claim:

1. A gas turbine engine comprising:

a low pressure turbine;

a booster compressor coupled to said low pressure turbine by a first shaft;

a high pressure compressor for receiving airflow from said booster compressor;

a high pressure turbine coupled to said high pressure compressor by a second shaft;

a combustor located intermediate said high pressure compressor and said high pressure turbine;

a power turbine downstream of said high pressure turbine;

an exhaust heat boiler coupled to receive exhaust from said power turbine, an outlet of said exhaust heat boiler coupled to an inlet of said low pressure turbine; and a control valve for controlling flow of steam from said exhaust heat boiler to said pressure turbine, wherein a speed of said booster compressor is controllable substantially independently of a speed of said high pressure compressor.

2. An engine in accordance with claim 1 further comprising an intercooler coupled to an outlet of said low pressure compressor and to an inlet of said high pressure compressor.

3. An engine in accordance with claim 1 further comprising a generator coupled to said power turbine by an output shaft.

4. An engine in accordance with claim 1 wherein said outlet of said exhaust heat boiler is further coupled to said combustor and to said power turbine.

5. An engine in accordance with claim 1 further comprising a steam turbine, said outlet of said exhaust heat boiler coupled to an inlet of said steam turbine.

6. An engine in accordance with claim 1 wherein steam from said low pressure turbine is supplied to at least one of said combustor, said high pressure turbine, and said power turbine.

7. A gas turbine engine comprising:

a steam driven low pressure turbine;

a booster compressor coupled to said low pressure turbine by a first shaft;

a high pressure compressor for receiving airflow from said booster compressor;

a high pressure turbine coupled to said high pressure compressor by a second shaft;

a combustor located intermediate said high pressure compressor and said high pressure turbine;

an intercooler coupled to an outlet of said low pressure compressor and to an inlet of said high pressure compressor; and a power turbine downstream of said high pressure turbine, and a generator coupled to said power turbine by an output shaft.

8. An engine in accordance with claim 7 further comprising an exhaust heat boiler coupled to receive exhaust from said power turbine, an outlet of said exhaust heat boiler coupled to an inlet of said low pressure turbine.

9. An engine in accordance with claim 8 further comprising a control valve for controlling flow of steam from said exhaust heat boiler to said low pressure turbine.

10. An engine in accordance with claim 8 wherein said outlet of said exhaust heat boiler is further coupled to said combustor and to said power turbine.

11. An engine in accordance with claim 8 further comprising a steam turbine, said outlet of said exhaust heat boiler coupled to an inlet of said steam turbine.

12. An engine in accordance with claim 8 wherein steam from said low pressure turbine is supplied to at least one of said combustor, said high pressure turbine, and said power turbine.

13. A gas turbine engine comprising:

a low pressure turbine;

a booster compressor coupled to said low pressure turbine by a first shaft;

a high pressure compressor for receiving airflow from said booster compressor;

a high pressure turbine coupled to said high pressure compressor by a second shaft;

a combustor located intermediate said high pressure compressor and said high pressure turbine;

a power turbine downstream of said high pressure turbine;

a generator coupled to said power turbine by an output shaft; and an exhaust heat boiler coupled to receive exhaust from said power turbine, said exhaust heat boiler supplying steam to said low pressure turbine.

14. An engine in accordance with claim 13 further comprising a control valve for controlling flow of steam from said exhaust heat boiler to said low pressure turbine.

15. An engine in accordance with claim 13 wherein said exhaust heat boiler further supplying steam to at least one of said combustor, said high pressure turbine, and said power turbine.

16. An engine in accordance with claim 15 further comprising a control valve for controlling flow of steam from said exhaust heat boiler to said at least one of said combustor, said high pressure turbine, and said power turbine.

17. An engine in accordance with claim 13 further comprising a steam turbine, said exhaust heat boiler further supplying steam to said steam turbine.

18. An engine in accordance with claim 13 further comprising an intercooler coupled to said low pressure compressor and to said high pressure compressor.

* * * * *

UNITED STATES PATENT AND TRADEMARK OFFICE
CERTIFICATE OF CORRECTION

PATENT NO. : 6,003,298

DATED : December 21, 1999

INVENTOR(S) : Michael W. Horner

It is certified that error appears in the above-identified patent and that said Letters Patent is hereby corrected as shown below:

In claim 10, column 5, line 1, change "Arqengine"

to

--An engine--

Signed and Sealed this

Twelfth Day of September, 2000

Attest:

Q. TODD DICKINSON

Attesting Officer

Director of Patents and Trademarks